(12) United States Patent
Hart et al.

(10) Patent No.: US 10,176,643 B2
(45) Date of Patent: Jan. 8, 2019

(54) METHOD OF GENERATING VIRTUAL THREE-DIMENSIONAL SPACE, VIDEO SYSTEM, METHOD OF CONTROLLING VIDEO SYSTEM, AND NON-TRANSITORY COMPUTER READABLE STORAGE MEDIUM

(71) Applicant: CAPCOM CO., LTD., Osaka (JP)

(72) Inventors: Thomas Hart, Osaka (JP); Minoru Nakai, Osaka (JP); Koichi Yamagishi, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/563,320

(22) PCT Filed: Mar. 30, 2015

(86) PCT No.: PCT/JP2015/001812
§ 371 (c)(1),
(2) Date: Sep. 29, 2017

(87) PCT Pub. No.: WO2016/157247
PCT Pub. Date: Oct. 6, 2016

(65) Prior Publication Data
US 2018/0068488 A1   Mar. 8, 2018

(51) Int. Cl.
*G06T 19/00*   (2011.01)
*G06F 3/01*   (2006.01)
(Continued)

(52) U.S. Cl.
CPC ............ *G06T 19/006* (2013.01); *A63F 13/00* (2013.01); *G06F 3/011* (2013.01); *G06F 3/04815* (2013.01); *G06K 9/00671* (2013.01)

(58) Field of Classification Search
None
See application file for complete search history.

(56) References Cited

U.S. PATENT DOCUMENTS

2005/0035980 A1* 2/2005 Lonsing .................. G06T 15/00
345/633
2010/0315416 A1* 12/2010 Pretlove .................. G06T 7/001
345/419
(Continued)

OTHER PUBLICATIONS

State of play, "Lumino City" [online], searched on Feb. 24, 2015, Internet <http://www.stateofplaygames.com/work/lumino-city>.

*Primary Examiner* — David H Chu
(74) *Attorney, Agent, or Firm* — IP Business Solutions, LLC

(57) ABSTRACT

Three-dimensional reference object data indicating a boundary of a reference object contained in a real video image is generated from first data containing the real video image based on a positional relation between a virtual screen position where the real video image is displayed and a virtual camera position corresponding to a camera position. Second data is generated, which indicates an object constituting a virtual three-dimensional CG space generated by reproducing an actual space where the real video image is taken. Third data is data in which the virtual camera position in the virtual three-dimensional CG space is determined in such a manner that the boundary of the reference object in the reference object data and a boundary of the object corresponding to the reference object in the second data are caused to coincide with each other.

12 Claims, 14 Drawing Sheets

(51) Int. Cl.
    *G06F 3/0481*     (2013.01)
    *G06K 9/00*     (2006.01)
    *A63F 13/00*     (2014.01)

(56) References Cited

U.S. PATENT DOCUMENTS

| | | | |
|---|---|---|---|
| 2014/0176530 A1* | 6/2014 | Pathre | G06T 19/20 345/419 |
| 2014/0316611 A1* | 10/2014 | Parente Da Silva | G06T 19/006 701/2 |
| 2016/0080732 A1* | 3/2016 | Pedley | G02B 27/0172 345/8 |
| 2017/0147713 A1* | 5/2017 | Reeves | G06F 17/5086 |

\* cited by examiner

METHOD OF GENERATING VIRTUAL THREE-DIMENSIONAL SPACE, VIDEO SYSTEM, METHOD OF CONTROLLING VIDEO SYSTEM, AND NON-TRANSITORY COMPUTER READABLE STORAGE MEDIUM

TECHNICAL FIELD

The present invention relates to a method of generating a virtual three-dimensional space, a video system, a method of controlling a video system, and a non-transitory computer readable storage medium.

BACKGROUND ART

Conventionally, there are games, such as action games and roll-playing games, in which a player character moves in a virtual three-dimensional game space in accordance with an operation of a user. Generally, the three-dimensional game space is generated by computer graphics. In recent years, the computer graphics has high definition and can express actual scenery and the like with a high degree of reproduction. However, such expression by the computer graphics is not equal to an actual video image (real video image) taken by a video camera or the like.

Games have been developed, in which characters can be operated in the three-dimensional game space generated by using actual video images instead of background images generated by computer graphics (see Non Patent Literature 1, for example).

CITATION LIST

Non Patent Literature

Non Patent Literature 1: State of play, "Lumino City" [online], [searched on Feb. 24, 2015], Internet <http://www.stateofplaygames.com/work/lumino-city>

SUMMARY OF INVENTION

Technical Problem

According to a game of Non Patent Literature 1, characters two-dimensionally move on two-dimensional images displayed as the real video images. Therefore, movements in a depth direction are restricted. As above, conventional configurations have a problem that strange feelings are caused when moving characters in the depth direction using the real video images having depth.

An object of the present invention is to provide a method of generating a virtual three-dimensional space, a video system, a method of controlling a video system, and a non-transitory computer readable storage medium, each of which can express a depth direction in a virtual three-dimensional space using a real video image without causing strange feelings.

Solution to Problem

A method of generating a virtual three-dimensional space according to one aspect of the present invention includes: specifying a positional relation between a virtual screen position and a virtual camera position from first data containing a real video image of an actual space, the real video image being taken from a predetermined camera position at a predetermined view angle, the real video image being displayed at the virtual screen position, the virtual camera position corresponding to the predetermined camera position, and generating three-dimensional reference object data which indicates a boundary of a predetermined reference object contained in the real video image and in which the boundary is associated with the predetermined reference object in the real video image based on the positional relation; generating second data indicating an object constituting a virtual three-dimensional CG space generated by reproducing the actual space, where the real video image is taken, by computer graphics; and generating third data based on the first data and the second data, the third data being data for generating the virtual three-dimensional space, wherein the step of generating the third data causes the boundary of the predetermined reference object in the reference object data and a boundary of the object corresponding to the predetermined reference object in the second data to coincide with each other to generate the third data in which the virtual camera position in the virtual three-dimensional CG space is determined based on the predetermined view angle of the real video image.

Advantageous Effects of Invention

The present invention can provide a method of generating a virtual three-dimensional space, a video system, a method of controlling a video system, and a non-transitory computer readable storage medium, each of which can express a depth direction in a virtual three-dimensional space using a real video image without causing strange feelings.

DESCRIPTION OF EMBODIMENTS

Figure 1:
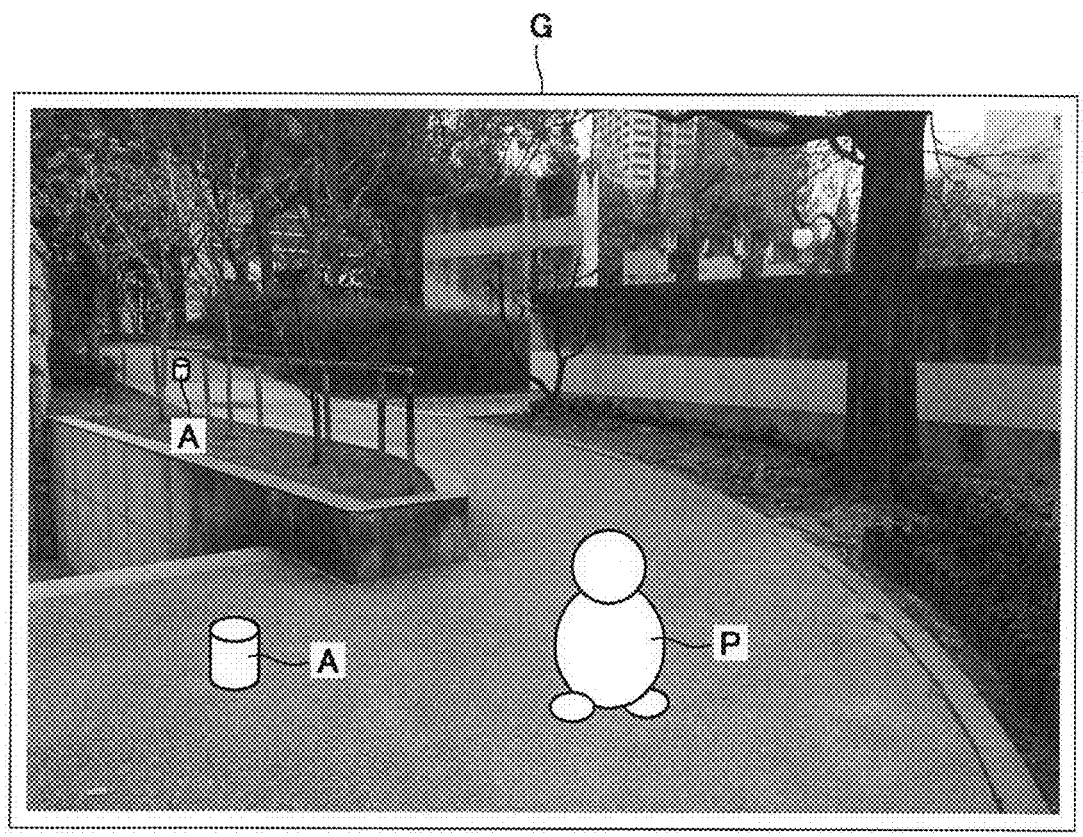
FIG. 1 is a diagram showing an example of a game screen image in the present embodiment.

A method of generating a virtual three-dimensional space according to one aspect of the present invention includes: specifying a positional relation between a virtual screen position and a virtual camera position from first data containing a real video image of an actual space, the real video image being taken from a predetermined camera position at a predetermined view angle, the real video image being displayed at the virtual screen position, the virtual camera position corresponding to the predetermined camera position, and generating three-dimensional reference object data which indicates a boundary of a predetermined reference object contained in the real video image and in which the boundary is associated with the predetermined reference object in the real video image based on the positional relation; generating second data indicating an object constituting a virtual three-dimensional CG space generated by reproducing the actual space, where the real video image is taken, by computer graphics; and generating third data based on the first data and the second data, the third data being data for generating the virtual three-dimensional space, wherein the step of generating the third data causes the boundary of the predetermined reference object in the reference object data and a boundary of the object corresponding to the predetermined reference object in the second data to coincide with each other to generate the third data in which the virtual camera position in the virtual three-dimensional CG space is determined based on the predetermined view angle of the real video image.

The method of generating a virtual three-dimensional space may further include generating a character that is movable in the virtual three-dimensional space.

The method of generating a virtual three-dimensional space may further include: displaying the real video image reproduced as a two-dimensional image of the virtual three-dimensional space, the two-dimensional image being viewed from the virtual camera position; and when the character overlaps a predetermined object in the real video image displayed as the two-dimensional image and is located at an opposite side from the virtual camera position across a position of an object corresponding to the predetermined object in the virtual three-dimensional space, performing transparent processing of making a part of the character transparent, the part overlapping the predetermined object.

The reference object data generating step may acquire a characteristic point group of the real video image, containing the predetermined reference object, to generate the reference object data.

The predetermined reference object may be an artificial object provided in the actual space.

The method of generating a virtual three-dimensional space may be designed such that: the real video image is produced by taking a video image including the artificial object set as the predetermined reference object and then removing the artificial object while continuously taking the video image; when generating the reference object data, a part of the real video image is utilized, the part containing the artificial object; and when generating the virtual three-dimensional space by the real video image, a different part of the real video image is utilized, the different part not containing the artificial object.

A video system operable by a user according to another aspect of the present invention includes: a data loading module configured to load a data group including first data containing a real video image of an actual space, the real video image being taken from a predetermined camera position at a predetermined view angle, second data indicating a boundary of an object constituting a virtual three-dimensional CG space generated by reproducing the actual space, where the real video image is taken, by computer graphics, and third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space; a virtual three-dimensional space generating module configured to generate a virtual three-dimensional space generated by combining the first data and the second data based on the third data; a two-dimensional image displaying module configured to display the real video image reproduced as a two-dimensional image of the virtual three-dimensional space, the two-dimensional image being viewed from the virtual camera position; and a character control module configured to perform such a control operation that a predetermined character object is movable in the virtual three-dimensional space displayed as the two-dimensional image.

The video system may further include a transparent processing module configured to, when the character object overlaps a predetermined object in the real video image displayed as the two-dimensional image and is located at an opposite side from the virtual camera position across a position of an object corresponding to the predetermined object in the virtual three-dimensional space, perform transparent processing of making a part of the character object transparent, the part overlapping the predetermined object.

A method of controlling a video system operable by a user according to yet another aspect of the present invention includes: loading a data group including first data containing a real video image of an actual space, the real video image being taken from a predetermined camera position at a predetermined view angle, second data indicating a boundary of an object constituting a virtual three-dimensional CG space generated by reproducing the actual space, where the real video image is taken, by computer graphics, and third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space; generating a virtual three-dimensional space generated by combining the first data and the second data based on the third data; displaying the real video image reproduced as a two-dimensional image of the virtual three-dimensional space, the two-dimensional image being viewed from the virtual camera position; and performing such a control operation that a predetermined character object is movable in the virtual three-dimensional space displayed as the two-dimensional image.

The method of controlling a video system may further include, when the character object overlaps a predetermined object in the real video image displayed as the two-dimensional image and is located at an opposite side from the virtual camera position across a position of an object corresponding to the predetermined object in the virtual three-dimensional space, performing transparent processing of making a part of the character object transparent, the part overlapping the predetermined object.

A storage medium according to still another aspect of the present invention is a non-transitory computer readable storage medium storing a command executable by a control unit of a computer device, the command including loading a data group including first data containing a real video image of an actual space, the real video image being taken from a predetermined camera position at a predetermined view angle, second data indicating a boundary of an object constituting a virtual three-dimensional CG space generated by reproducing the actual space, where the real video image is taken, by computer graphics, and third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space; generating a virtual three-dimensional space generated by combining the first data and the second data based on the third data; displaying the real video image reproduced as a two-dimensional image of the virtual three-dimensional space, the two-dimensional image being viewed from the virtual camera position; and performing such a control operation that a predetermined character object is movable in the virtual three-dimensional space displayed as the two-dimensional image.

The command may further include, when the character object overlaps a predetermined object in the real video image displayed as the two-dimensional image and is located at an opposite side from the virtual camera position across a position of an object corresponding to the predetermined object in the virtual three-dimensional space, performing transparent processing of making a part of the character object transparent, the part overlapping the predetermined object.

Hereinafter, a method of generating a virtual three-dimensional space, a video system, a method of controlling a video system, and a non-transitory computer readable storage medium according to an embodiment of the present invention will be explained in reference to the drawings. The present embodiment will explain an example of a game for operating characters that can act in a generated virtual three-dimensional space.

Outline of Virtual Three-Dimensional Space Generated in Present Embodiment

Figure 2:
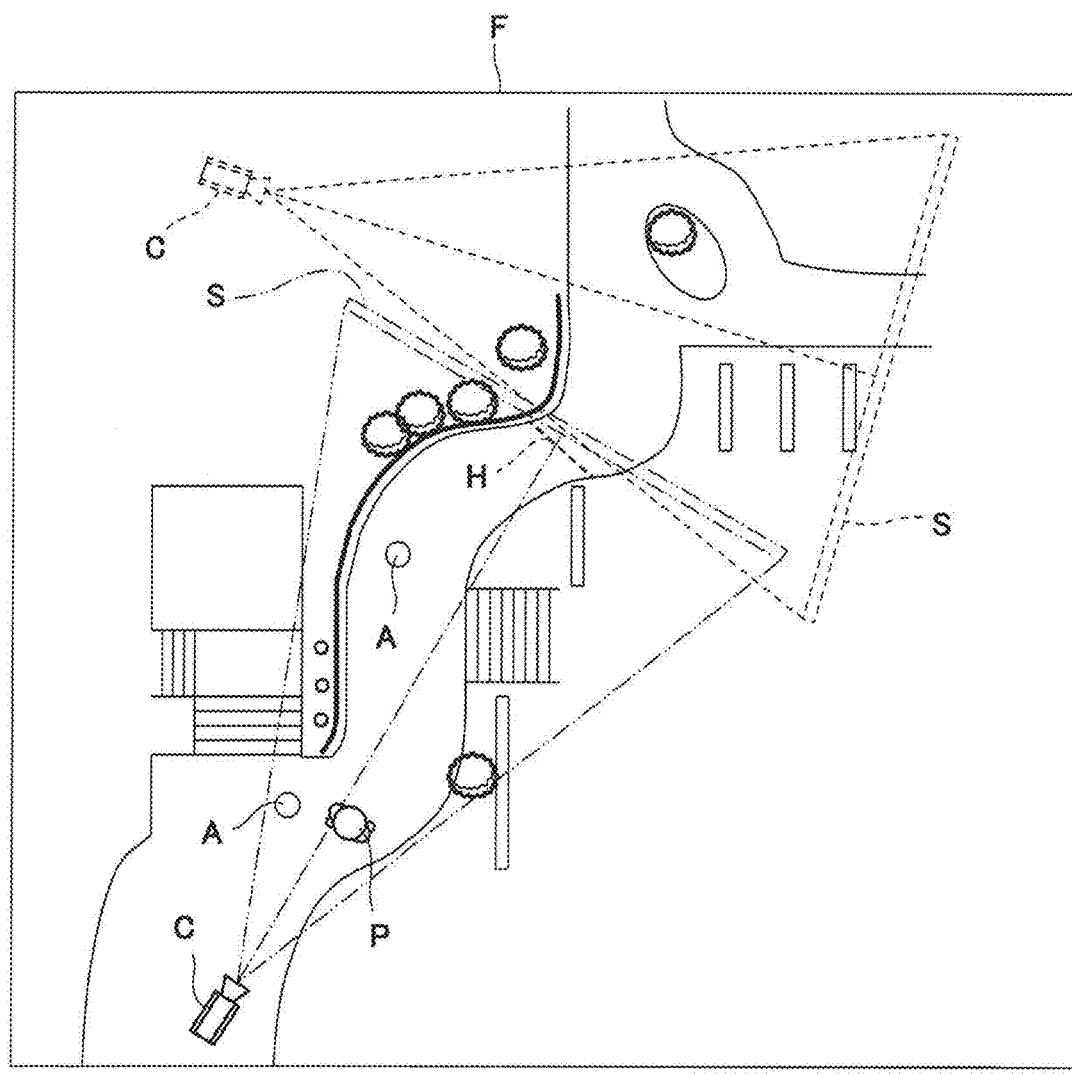
FIG. 2 is a top view showing an example of a virtual three-dimensional space in the present embodiment.

The virtual three-dimensional space in the present embodiment is generated for displaying a game screen image that can realize that characters look as if they act in a taken real video image of an actual space. FIG. 1 is a diagram showing an example of the game screen image in the present embodiment. FIG. 2 is a top view showing an example of the virtual three-dimensional space in the present embodiment. A game screen image G shown in FIG. 1 is expressed as a two-dimensional image generated of a virtual three-dimensional space F of FIG. 2 which image is viewed from a virtual camera C (shown by solid lines).

As shown in FIGS. 1 and 2, the virtual three-dimensional space F where a character P acts is expressed by the real video image on the game screen image G. To be specific, the real video image is displayed on the game screen image G as a video image of the virtual three-dimensional space F which image is taken by the virtual camera C provided at a virtual camera position in the virtual three-dimensional space F. An imaging range of the virtual camera C is determined by a view angle of the virtual camera C and becomes a range of a virtual screen S provided at a virtual screen position corresponding to the virtual camera position of the virtual three-dimensional space F. Further, an object A such as is also displayed on the game screen image G. The object A is arranged in the virtual three-dimensional space F in the imaging range of the virtual camera C and is, for example, an item that the character P can obtain.

Further, boundaries are set for objects contained in the real video image. For example, the actions (movements and the like) of the character P are restricted by boundaries set for trees, walls, and the like. In addition, a boundary set for a ground surface or the like determines an upward/downward-direction position (height-direction position) of the character P located on the boundary.

When the character P is located at a predetermined camera switching position H, the video image displayed on the game screen image G is switched to a video image taken by another virtual camera C. For example, when the character P reaches the camera switching position H in a state where the video image taken by the virtual camera C shown by solid lines in FIG. 2 is being displayed on the game screen image G (i.e., in a state where the game screen image shown in FIG. 1 is being displayed), the video image taken by the virtual camera C shown by broken lines in FIG. 2 is displayed on the game screen image G.

Method of Generating Virtual Three-Dimensional Space

Figure 3:
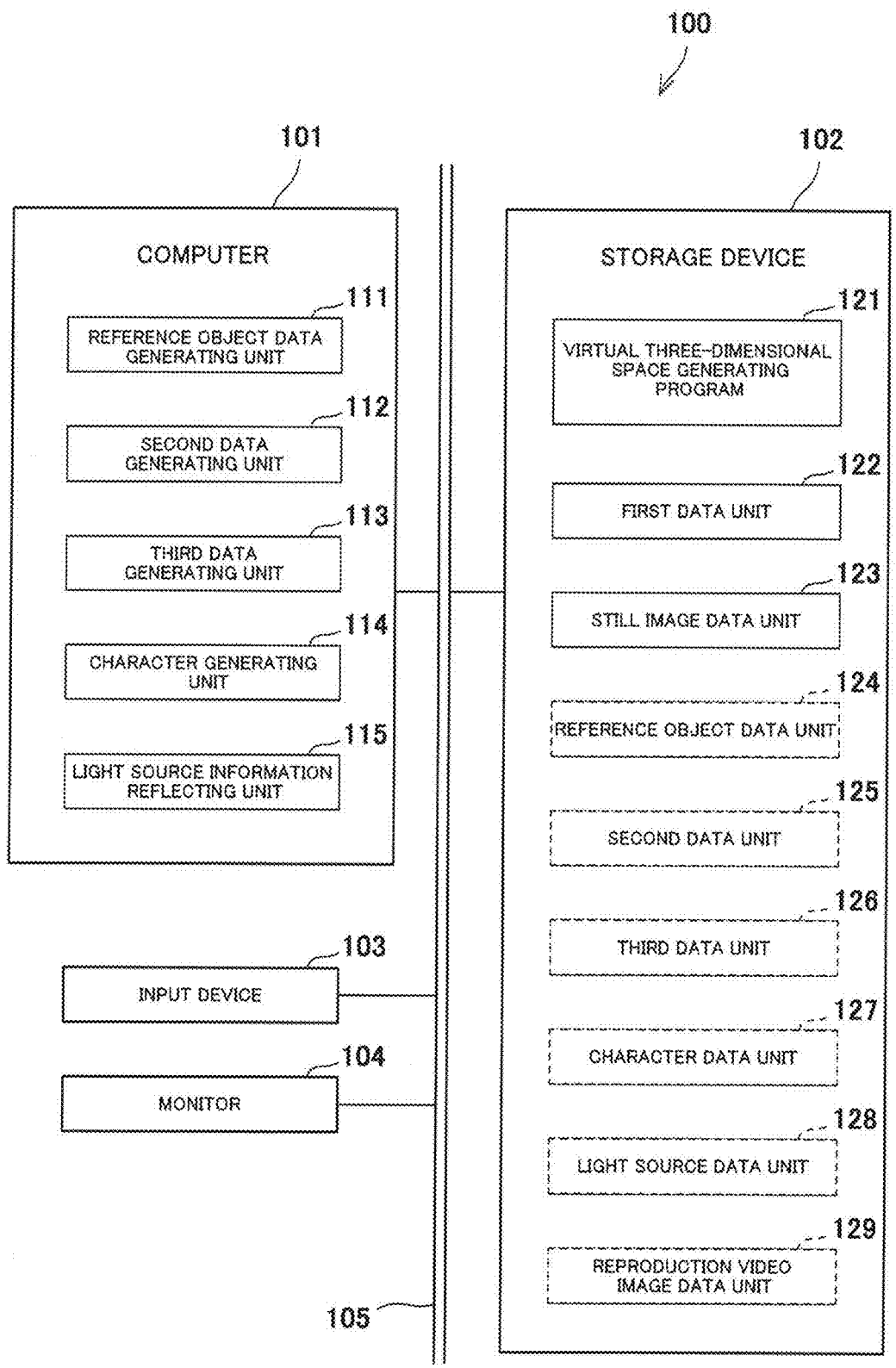
FIG. 3 is a block diagram showing a schematic configuration of a computer system configured to generate the virtual three-dimensional space in the present embodiment.

FIG. 3 is a block diagram showing a schematic configuration of a computer system configured to generate the virtual three-dimensional space in the present embodiment. As shown in FIG. 3, a computer system 100 includes: a computer 101 configured to perform various calculations; a storage device 102, such as a hard disk device, configured to store various data; an input device 103, such as a keyboard or a mouse; and a monitor 104. These components can transmit signals to one another by a bus signal line 105.

The storage device 102 stores a virtual three-dimensional space generating program 121. In FIG. 3, the virtual three-dimensional space generating program 121 is shown as one program. However, as will be described later, the virtual three-dimensional space generating program 121 may be constituted by a plurality of programs. The storage device 102 further stores first data 122 containing the real video image of the actual space which image is taken from a predetermined camera position at a predetermined view angle.

The computer 101 includes a CPU, an internal memory, and the like. Based on the virtual three-dimensional space generating program 121 stored in the storage device 102, the computer 101 achieves respective functions of a reference object data generating unit (reference object data generating module) 111, a second data generating unit (second data generating module) 112, a third data generating unit (third data generating module) 113, a character generating unit (character generating module) 114, and a light source information reflecting unit (light source information reflecting module) 115.

Generation of Reference Object Data

Hereinafter, explanations will be made in order. The reference object data generating unit 111 specifies a positional relation between a virtual screen position and a virtual camera position from the first data (real video image data) 122 containing the real video image of the actual space which image is taken from a predetermined camera position at a predetermined view angle, the real video image being displayed at the virtual screen position, the virtual camera position corresponding to the predetermined camera position. Then, the reference object data generating unit 111 generates three-dimensional reference object data 123 which indicates a boundary of a predetermined reference object contained in the real video image and in which the boundary of the predetermined reference object is associated with the predetermined reference object in the real video image based on the positional relation.

Figure 4:
FIG. 4 is a diagram showing a process of generating characteristic points in a process of generating reference object data in the present embodiment, the characteristic points each indicating a boundary of a reference object.
Figure 5:
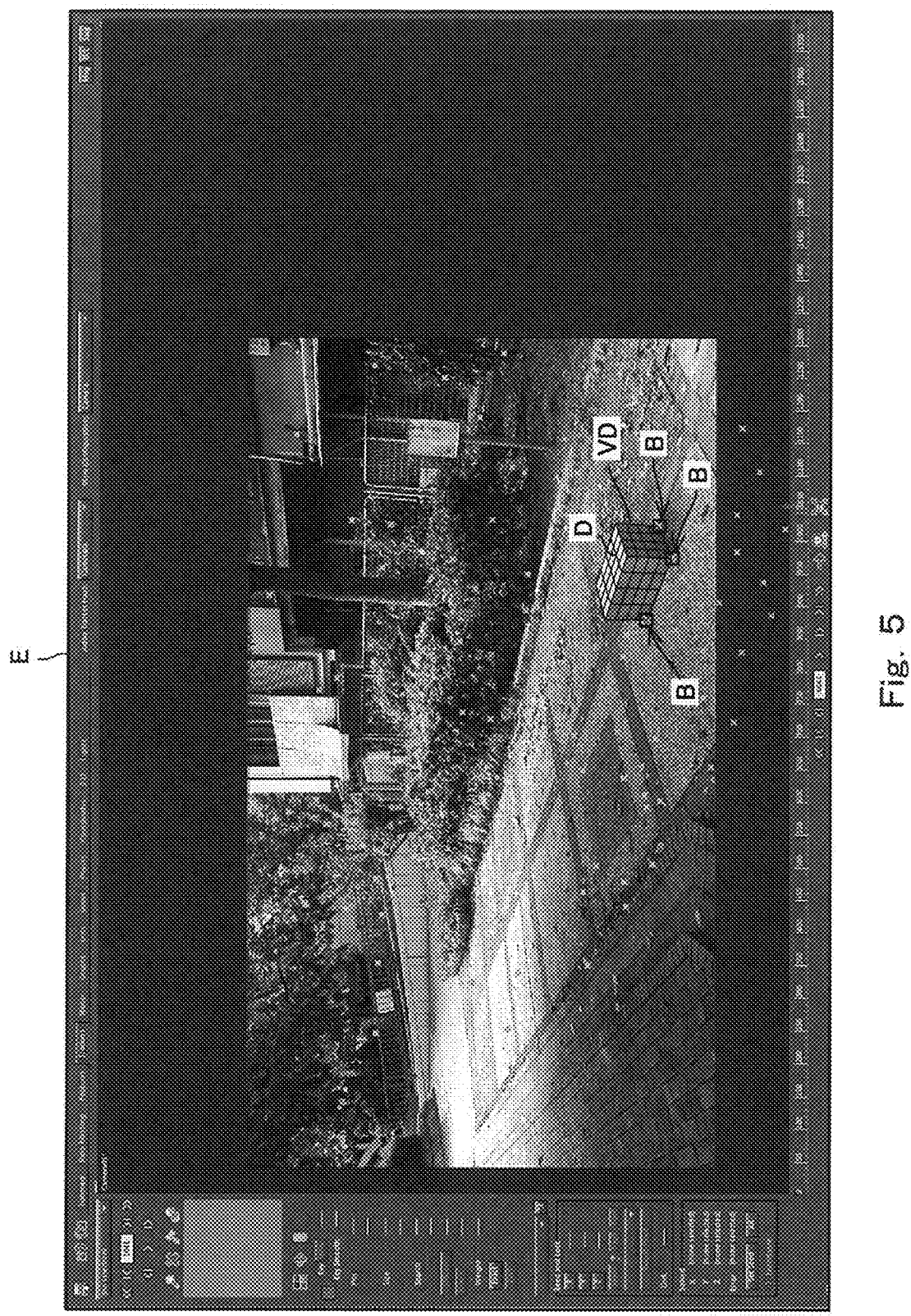
FIG. 5 is a diagram showing a process of generating a virtual reference object in the process of generating the reference object data in the present embodiment.
Figure 6:
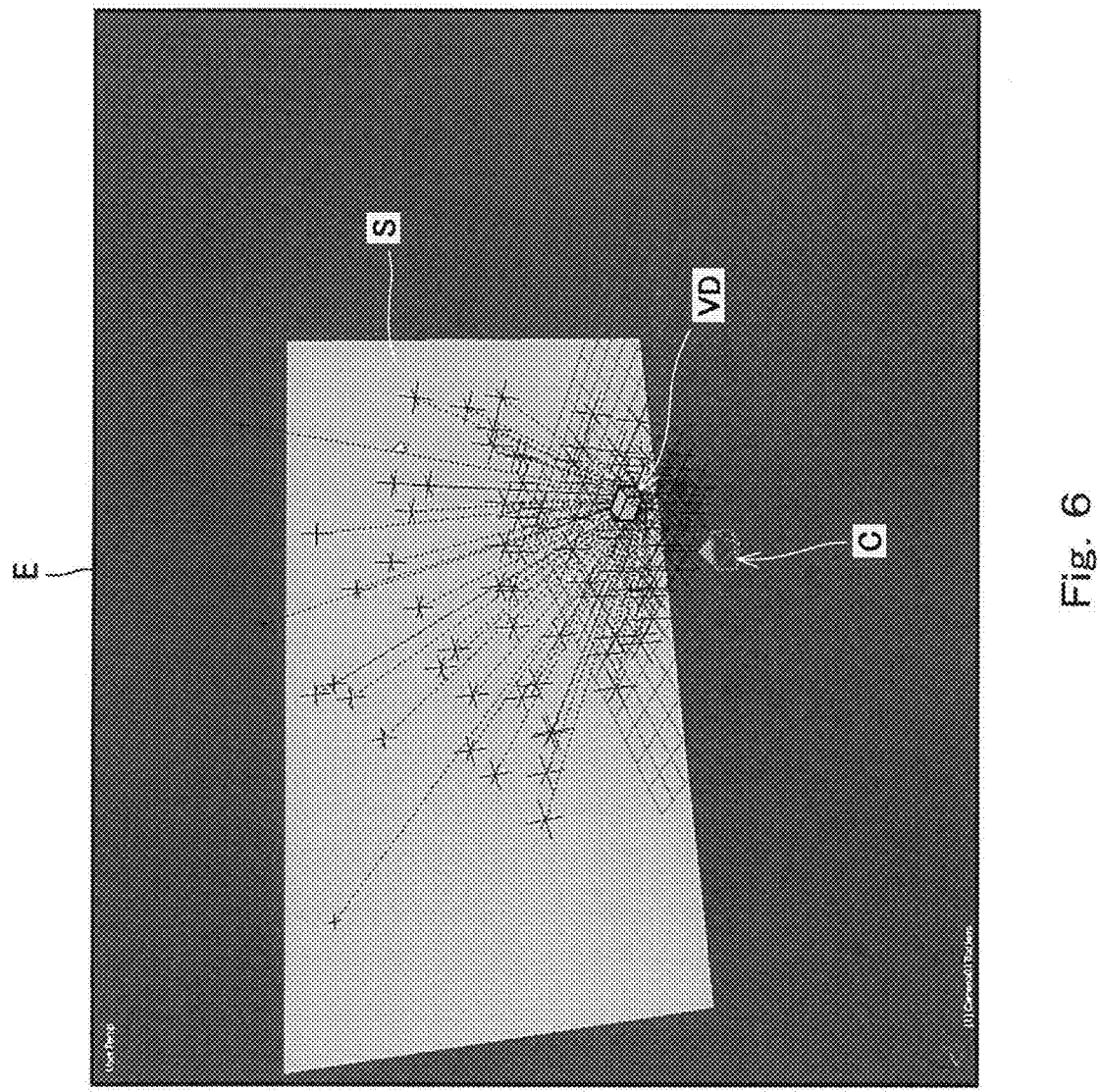
FIG. 6 is a diagram schematically showing characteristic information contained in the reference object data in the process of generating the reference object data in the present embodiment.

FIGS. 4 to 6 are diagrams each showing a process of generating the reference object data in the present embodiment. First, a real video image of an image pickup region shown in FIG. 4 is taken by a digital video camera or the like. At this time, an artificial object is provided in the actual space as a reference object D for determining a scale of the real video image, and the real video image is taken so as to contain the artificial object. In an example of FIG. 4, a rectangular solid such as a cardboard box that is an artificial object is used as the reference object D. It is preferable that: the reference object D have corners; and a plurality of surfaces constituting each corner be mutually at right angles. It should be noted that instead of providing an artificial object in the real video image, an artificial object or a natural object originally contained in the real video image may be set as the reference object D. In the process of generating the reference object data, a three-dimensional camera tracking program, such as "SynthEyes" (Andersson Technologies LLC), may be used as the virtual three-dimensional space generating program 121.

The reference object data generating unit 111 performs tracking processing of the taken real video image to generate boundary data indicating a positional relation between the camera position where the real video image is taken and the boundary of an object (reference object, ground surface, wall, tree, etc.) in the taken real video image. The positional relation between the virtual screen position where the real video image is displayed and the virtual camera position corresponding to the camera position is specified by the boundary data and the view angle of the camera which has taken the real video image. In the example of FIG. 4, the reference object data generating unit 111 generates the boundary data by acquiring a characteristic point group of the real video image containing the reference object. The characteristic point group is a group of data in each of which a characteristic point has a three-dimensional position coordinate. On a processing screen image E shown in FIG. 4, each characteristic point is shown by x. Especially, to acquire the accurate boundary data regarding the reference object D, it is preferable that the real video image be taken by panning the digital video camera such that the camera position moves along a certain range of a circumference of the reference object D.

If the boundary data of the reference object D is not adequately generated only by the tracking processing, a user may be able to arrange (the characteristic point indicating) the three-dimensional position coordinate of the reference object D on the real video image. It is preferable that if the reference object D has corners, characteristic points B each indicating the boundary of the reference object D be provided at positions of the corners of the reference object D. When using the rectangular solid having a known size as in the example of FIG. 4, it is only required to provide at least three characteristic points B, each indicating the boundary of the reference object D, at vertexes of any one of surfaces of the reference object D. With this, position coordinates of the other corners can be acquired by calculations.

After the characteristic points B each indicating the boundary of the reference object D are specified, a virtual reference object VD indicating a three-dimensional boundary of the entire reference object D is generated based on the characteristic points B as shown in FIG. 5. The virtual reference object VD is generated by, for example, polygons. The virtual reference object VD may generated in such a manner that a user operates the input device 103 to draw the virtual reference object VD based on the characteristic points B each showing the boundary of the reference object D, or the reference object data generating unit 111 may automatically generate the virtual reference object VD based on the characteristic points B. As a result, as shown in FIG. 6, the reference object data 123 is generated, in which the virtual reference object VD (i.e., the boundary of the reference object D) is associated with the reference object D in the real video image such that when the virtual screen S is viewed from the position of the virtual camera C, a positional relation among the virtual screen S, the virtual camera C, and the virtual reference object VD becomes such a positional relation that the virtual reference object VD and the reference object D contained in the real video image coincide with each other. It should be noted that the processing screen image E of FIG. 6 also displays characteristic point groups indicating boundaries of objects other than the virtual reference object VD. Such characteristic point groups may or may not be contained in the reference object data 123. The generated reference object data 123 is stored in the storage device 102.

Generation of Second Data

Figure 7:
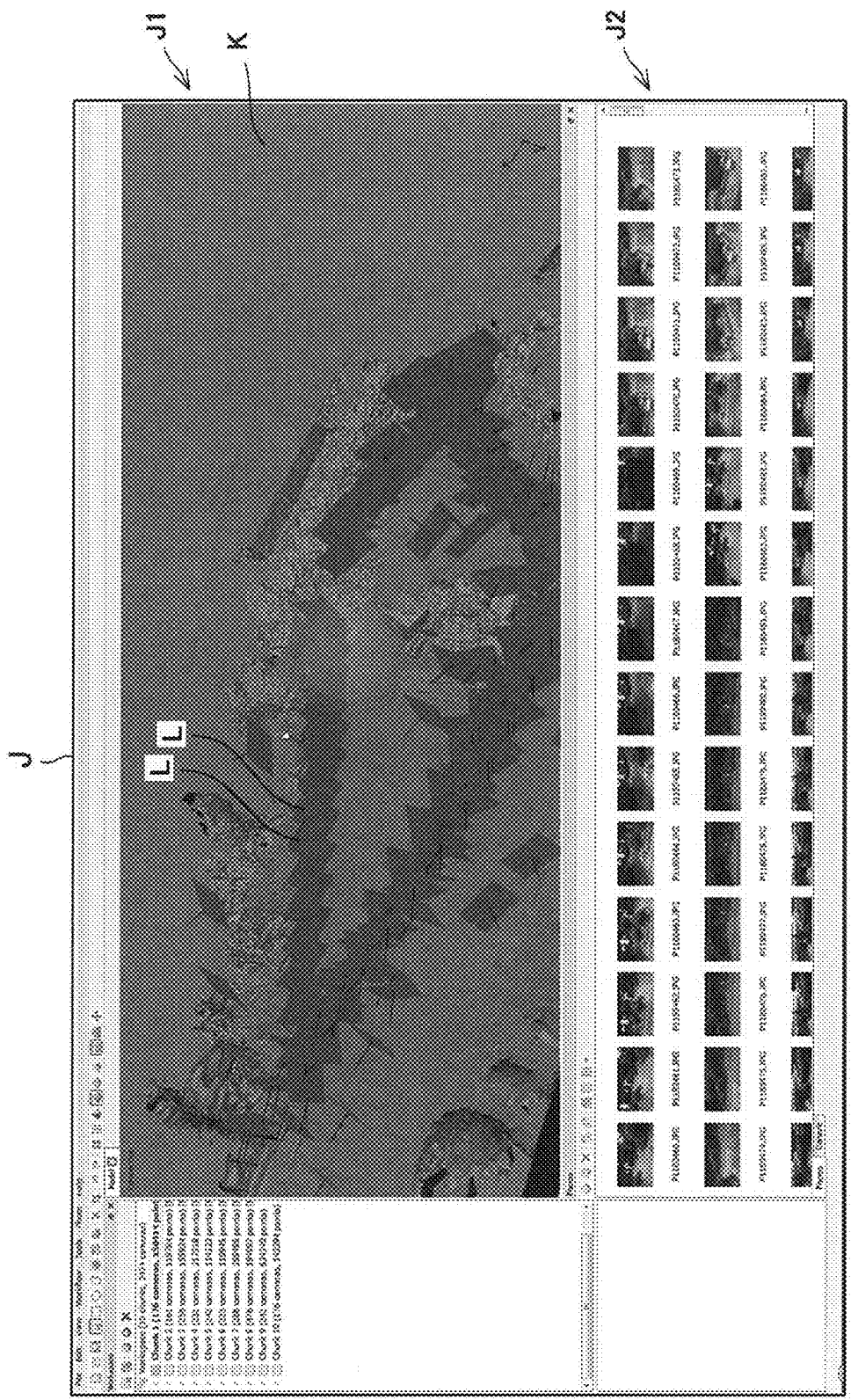
FIG. 7 is a diagram showing an example of a second data generating screen image in a process of generating second data in the present embodiment.
Figure 8:
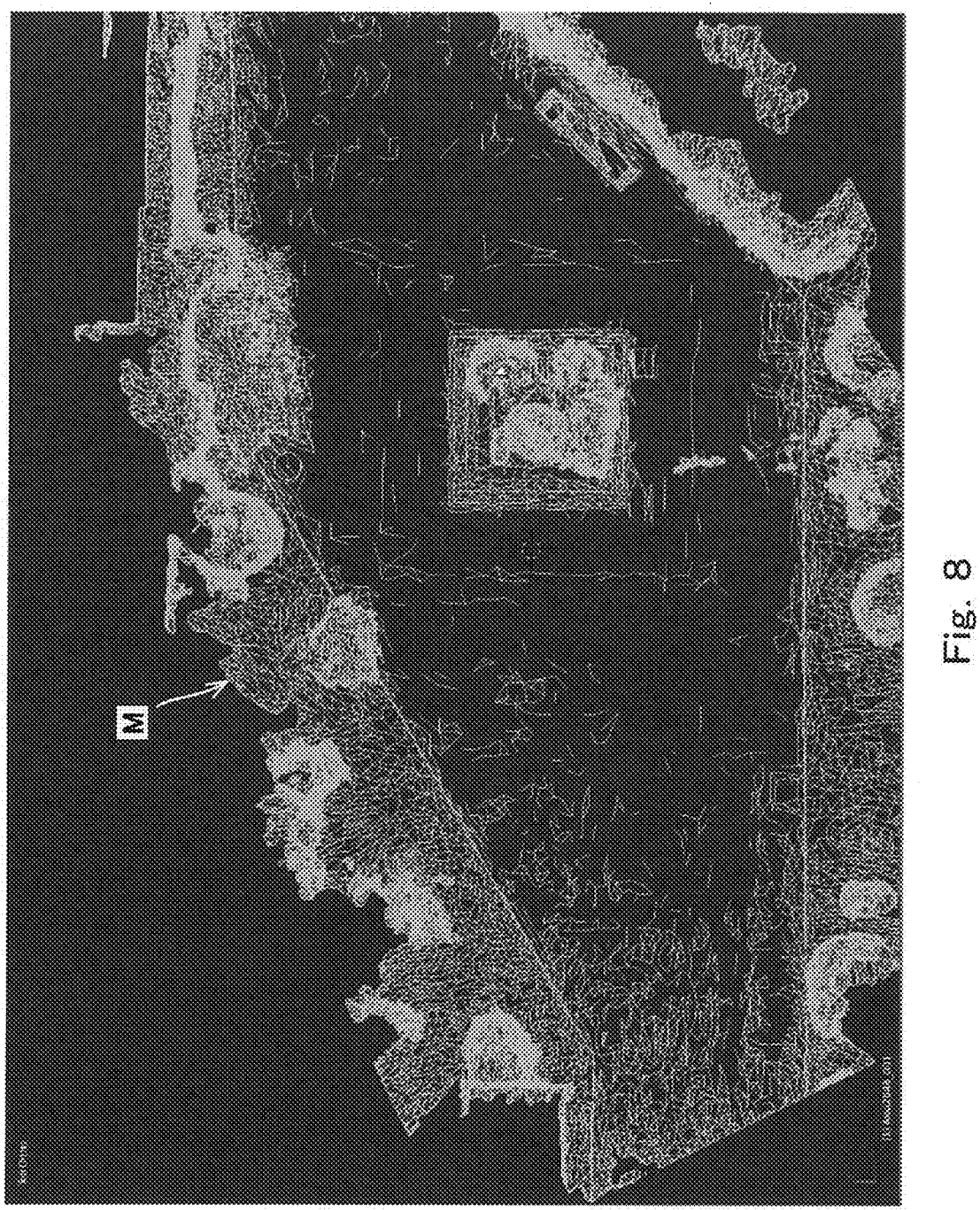
FIG. 8 is a diagram schematically showing characteristic information contained in the second data in the process of generating the second data in the present embodiment.

The second data generating unit 112 generates second data 125 indicating objects constituting a virtual three-dimensional CG space generated by reproducing the actual space, where the real video image is taken, by computer graphics (CG). FIGS. 7 and 8 are diagrams each showing a process of generating the second data in the present embodiment. In an example of FIG. 7, the second data generating unit 112 generates a virtual three-dimensional CG space K, which is a base of the second data 125, by three-dimensional scanning processing using a plurality of still images taken in the actual space contained in the real video image. The still image is taken by a digital still camera or the like and stored in the storage device 102 as still image data 108. At this time, the still image is taken in a state where the reference object D is provided when taking the real video image. To be specific, a position where the reference object D is provided in the real video image and a position where the reference object D is provided in the still image are the same as each other. As a result, the objects constituting the generated virtual three-dimensional CG space K include an object of the reference object D (i.e., a below-described reference object OD shown in FIG. 9).

As shown in FIG. 7, the generated virtual three-dimensional CG space K and still images L used to generate part of the virtual three-dimensional CG space K are associated with each other to be displayed at an upper stage J1 of a second data generating screen image J shown in FIG. 7. A list of the still images used to generate the virtual three-dimensional CG space K at the upper stage is associated with the group of the still images at the upper stage to be displayed at a lower stage J2 of the second data generating screen image J. As above, a plurality of (for example, several hundreds of) still images L are taken at a plurality of angles such that adjacent still images overlap each other, and the still images L are arranged such that images in adjacent still images L are continuous with each other. After that, the virtual three-dimensional CG space K is generated by performing the three-dimensional scanning processing. In the process of generating the second data, a three-dimensional scanning program such as "PhotoScan" (Agisoft LLC) can be utilized as the virtual three-dimensional space generating program 121.

The virtual three-dimensional CG space K contains information indicating the boundaries of the objects in the virtual three-dimensional CG space K. The boundaries of these objects are used to: perform a contact determination (movement restriction) of the character that acts in the virtual three-dimensional CG space K; or express a difference in height of the ground surface (for example, express that a character falls when a foot of the character separates from the ground surface). The second data generating unit 112 generates the object in the virtual three-dimensional CG space K as the second data 125. Specifically, data generated by making the virtual three-dimensional CG space K transparent is generated as the second data 125. For example, as shown in FIG. 8, the second data 125 contains only information regarding only polygon meshes M forming the boundaries of the objects in the virtual three-dimensional CG space K. In FIG. 8, the polygon meshes M are made visible. However, the polygon meshes M themselves are made transparent at the time of the completion of the generation of the below-described virtual three-dimensional space.

As above, the finally-generated virtual three-dimensional space does not require texture (texture generated by modeling of a plurality of still images) attached to the virtual three-dimensional CG space K. However, to generate below-described third data, it is preferable that the virtual three-dimensional CG space K be configured by high-resolution texture. Especially, when a user adjusts positions and sizes of the virtual reference object VD and the reference object OD as described below, it is preferable that the virtual three-dimensional CG space K be configured by high-resolution texture. With this, the user can easily perform fine adjustment in the above adjustment. It should be noted that: the second data 125 may contain texture information of the virtual three-dimensional CG space K until the third data is generated; and the texture information may be deleted from the second data 125 after the generation of the third data is completed. Or, the texture information may not be deleted from the second data 125. The generated second data 125 is stored in the storage device 102.

Generation of Third Data

Figure 9:
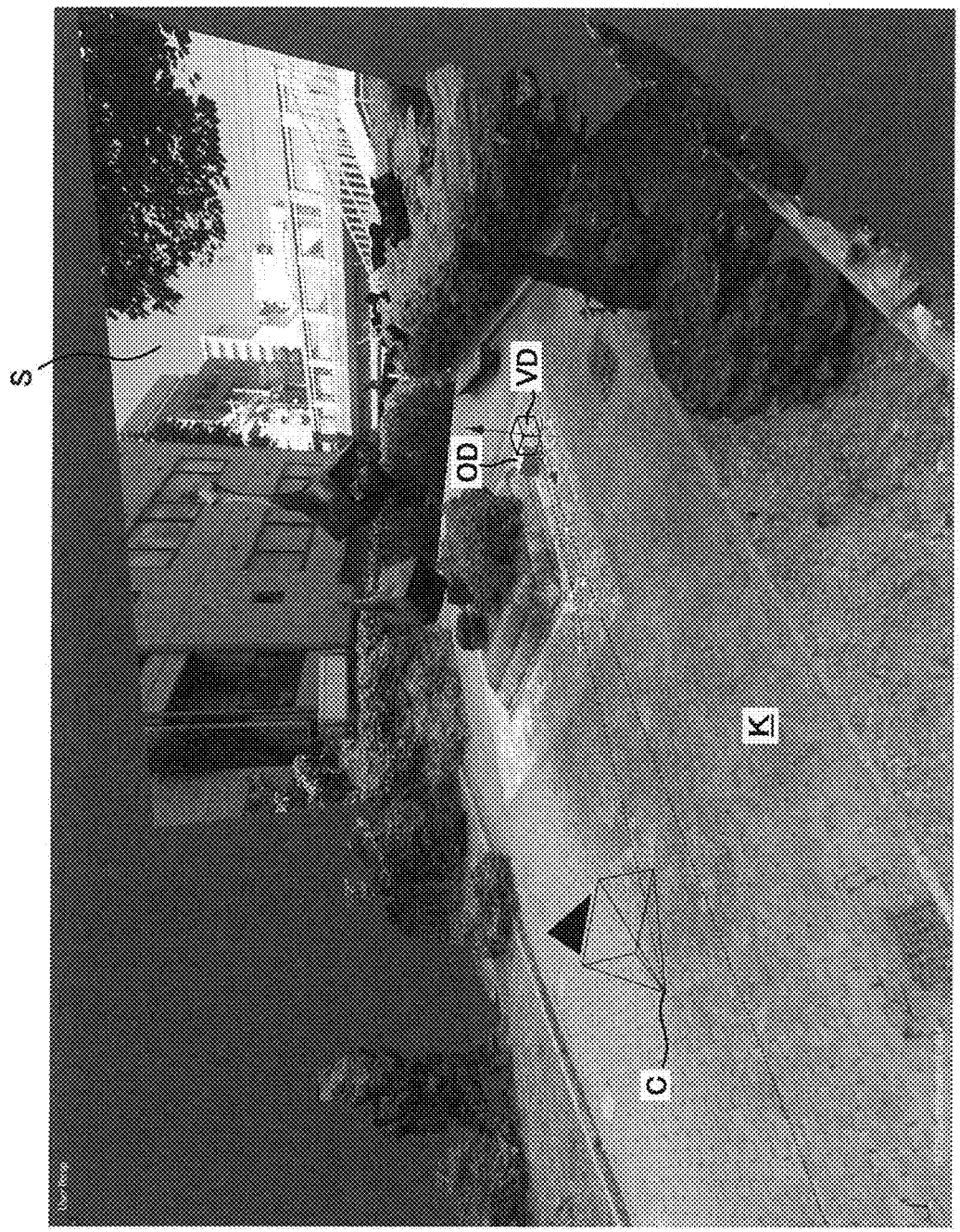
FIG. 9 is a diagram showing a state before a virtual reference object and a reference object coincide with each other, in a process of generating third data in the present embodiment.
Figure 10:
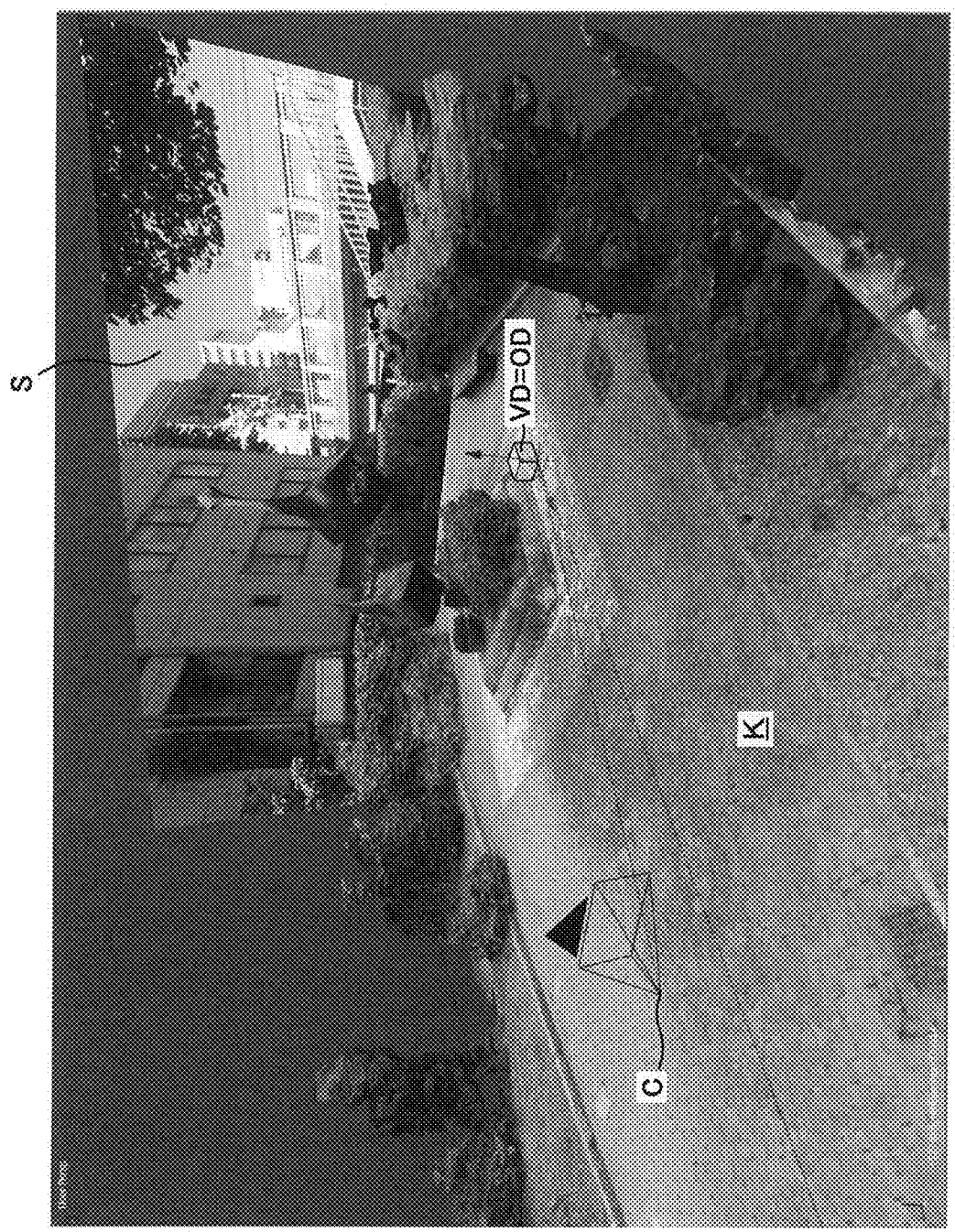
FIG. 10 is a diagram showing a state after the virtual reference object and the reference object coincide with each other, in the process of generating the third data in the present embodiment.

Based on the first data 122 and the second data 125, the third data generating unit 113 generates the third data for generating the virtual three-dimensional space. FIGS. 9 and 10 are diagrams each showing a process of generating the third data in the present embodiment. The third data generating unit 113 causes the boundary of the reference object D in the reference object data 123 and the boundary of the object corresponding to the reference object in the second data 125 to coincide with each other such that a state shown in FIG. 9 becomes a state shown in FIG. 10. With this, the third data generating unit 113 generates the third data in which the virtual camera position of the virtual camera C in the virtual three-dimensional CG space K is determined based on the view angle of the real video image. In the process of generating the third data, a three-dimensional CG integration environment application such as "Blender" (Blender.org, free software) can be utilized as the virtual three-dimensional space generating program 121.

As shown in FIG. 9, in a third data generating screen image N, drawing data of the virtual three-dimensional CG space K containing the second data 125 and the reference object data 123 are loaded on one virtual three-dimensional space. The position and size of the virtual reference object VD contained in the reference object data 123 are adjusted (are moved and subjected to enlarging/reducing processing) so as to coincide with those of the reference object OD contained in the virtual three-dimensional CG space K. When the position of the virtual reference object VD changes by such adjustment, the positions of the virtual camera C and the virtual screen S also change. The view angle of the virtual camera C (i.e., the view angle of the camera which has taken the real video image) is constant, so that when the size of the virtual reference object VD changes, a distance between the virtual camera C and the virtual screen S and the size (scale) of the virtual screen S also change.

Regarding such adjustments, a user may use the input device 103 to perform an operation of moving the virtual reference object VD relative to the virtual three-dimensional CG space K and/or an operation of enlarging or reducing the size of the virtual reference object VD relative to the virtual three-dimensional CG space K, or the third data generating unit 113 may automatically perform adjusting processing. When the third data generating unit 113 automatically performs the adjustment, the texture of the virtual three-dimensional CG space K may not be contained in the second data 125 at the start of the generation of the third data.

As a result of such adjustments, as shown in FIG. 10, the position of the virtual camera C in the virtual three-dimensional CG space K is determined based on the reference object data 123. The position of the virtual screen S is also determined based on the determined position of the virtual camera C. The determined position coordinate of the virtual camera C in the virtual three-dimensional CG space K is generated as third data 126, and the third data 126 is stored in the storage device 102.

When the real video image is reproduced on the virtual screen S by the third data 126 as a video image viewed from the virtual camera C, the reproduced real video image and the virtual three-dimensional CG space K viewed from the same virtual camera C become substantially the same in scene as each other. Therefore, by showing additional objects such as the item object A arranged (based on the boundary of the object that is the second data 125) in the virtual three-dimensional CG space K that is made transparent through the virtual camera C as the game screen image G shown in FIG. 1 and the character P that acts in the virtual three-dimensional CG space K, a user of a game can feel as if the character P is acting in the real video image.

By combining the first data 122 and the second data 125 based on the third data 126 generated as above, the virtual three-dimensional space F (FIG. 2) is generated. Therefore, in a game using the virtual three-dimensional space F, a real video image as a scene of the virtual three-dimensional space F viewed through the virtual camera C is displayed on the game screen image G (FIG. 1). Further, the actions of the additional objects, such as the character P and the item object A, displayed in the game screen image G are controlled based on the boundaries of the objects corresponding to the real video image, and the additional objects are arranged based on the boundaries of the objects corresponding to the real video image. As above, by applying information regarding the boundaries of the objects to the real video image, a concept regarding a depth direction can be added to the real video image that is a two-dimensional image. Therefore, the expression of the depth direction in the virtual three-dimensional space F using the real video image can be realized without causing strange feelings.

As shown in FIG. 2, when the virtual cameras C are arranged at a plurality of different virtual camera positions in the virtual three-dimensional space F, and the real video image displayed on the game screen image G is switched by switching the virtual cameras C in accordance with the movement of the character P, the reference object D used for generating the virtual three-dimensional space F is common among the plurality of real video images. To be specific, when taking the real video images at a plurality of virtual camera positions, each of the imaging ranges of the virtual cameras C at the virtual camera positions contains the same reference object D. Instead of this, a specific object (such as a bench, a telephone booth, or a traffic signal) contained in each of the imaging ranges of the virtual cameras C at a plurality of virtual camera positions may be adopted as the reference object D.

Real Video Image

Hereinafter, the real video image contained in the first data 122 will be explained again. Used as the real video image is a taken image including an artificial object set as the reference object for generating the reference object data 123. However, regarding the real video image displayed as the game screen image, the real video image not including the reference object D becomes, in some cases, a video image that does not cause strange feelings. In such cases, used as the real video image may be a video image which is first taken so as to include the artificial object set as the reference object D and from which the reference object D is then removed while continuously taking the video image.

For example, when the position of the virtual screen S is fixed in the finally-generated virtual three-dimensional space F (i.e., when a video image at a fixed position is displayed in the game screen image G), first, the reference object D is provided at a predetermined position of the actual space (i.e., a predetermined position in the imaging range of the camera at the fixed position), and image taking by the camera is started. Image taking is started without fixing the camera. To easily obtain reference point data, the image taking is performed while panning the camera in a predetermined range around the reference object D in leftward and rightward directions. After that, the camera is fixed at the fixed position while continuing the image taking. After the image taking is performed for a predetermined period of time while including the reference object D in the imaging range in a state where the camera is completely still at the fixed position, the reference object D is removed from the imaging range while continuing the image taking. After the two-dimensional image (game screen image shown in FIG. 1) of the virtual three-dimensional space F which image is viewed from the virtual camera C is taken for a predetermined necessary period of time, the image taking is terminated.

A part of the above real video image which part contains the reference object D and is taken when the camera is still after being panned is utilized when generating the reference object data 123. Further, another part of the real video image which part does not contain the reference object D and is taken when the camera is still is utilized when generating the virtual three-dimensional space F using the real video image. To be specific, this part of the real video image is utilized as a real video image reproduced on the virtual screen S in the virtual three-dimensional space F (i.e., displayed as the two-dimensional image on the game screen image G). With this, even if an artificial object that has nothing to do with the scene in the real video image is adopted as the reference object D, the existence of the reference object D can be deleted from the generated virtual three-dimensional space F.

Further, when the position of the virtual screen S is fixed, used as the real video image reproduced on the virtual screen S in the virtual three-dimensional space F is a loop video image which repeats a video image taken in a predetermined period of time. To be specific, reproduction video image data is generated, which is set such that a part of the taken real video image which part does not contain the reference object D is loop-reproduced. By adjusting a loop period and a connection between initial and final stages of the loop period, the reproduction video image data can realize a real video image that does not cause strange feelings. Such reproduction video image data 129 may be adopted as the first data 122 contained in game data used in a below-described game program.

Generation of Character

The character generating unit 114 generates the character P that is movable in the virtual three-dimensional space F. The character P may be constituted by a three-dimensional object. Further, the character P may be a three-dimensional object generated by three-dimensional scanning processing using a plurality of still images of an actual object which images are taken at a plurality of angles. Generated data of the character P is stored as character data 127 in the storage device 102.

Generation of Light Source Information

The light source information reflecting unit 115 acquires light source information of the actual space from the still image data 108 taken at a predetermined position of the actual space where the real video image is taken. Then, the light source information reflecting unit 115 reflects the light source information on the objects (the character P, the item object A, etc.) arranged in the virtual three-dimensional space F generated by the real video image. Therefore, as the still image data 108 for obtaining the light source information, the storage device 102 stores an image of a circumference of the predetermined position such that the circumference is continuous. The still image data 108 is an image taken by, for example, a 360-degree imaging camera under conditions (season, time, weather, etc.) that are substantially the same as conditions under which the real video image is taken. A still image subjected to high dynamic range imaging (HDRi) may be used as the still image data 108 for obtaining the light source information. More detailed light source information can be obtained by using a still image having a wide dynamic range (contrast ratio). The light source information generated as above is stored as light source data 128 in the storage device 102.

According to the above, when the objects (the character P, the item object A, etc.) other than the real video image are displayed on the game screen image G, shading expressions similar to the real video image can be easily added to the objects other than the real video image.

Example of Video Image Program Using Generated Virtual Three-Dimensional Space

As one example of the video image program using the virtual three-dimensional space F generated by the above method, the following will explain a configuration for realizing a game in which the character P can act in the virtual three-dimensional space F. According to the game of the present embodiment, while watching the game screen image G shown in FIG. 1, a user operates the character P to acquire the item object A and meet and talk with another character (non-player character; not shown) that acts in the virtual three-dimensional space F. Thus, the user proceeds with a scenario (game main story) in which a predetermined goal is set.

Hardware Configuration

Figure 11:
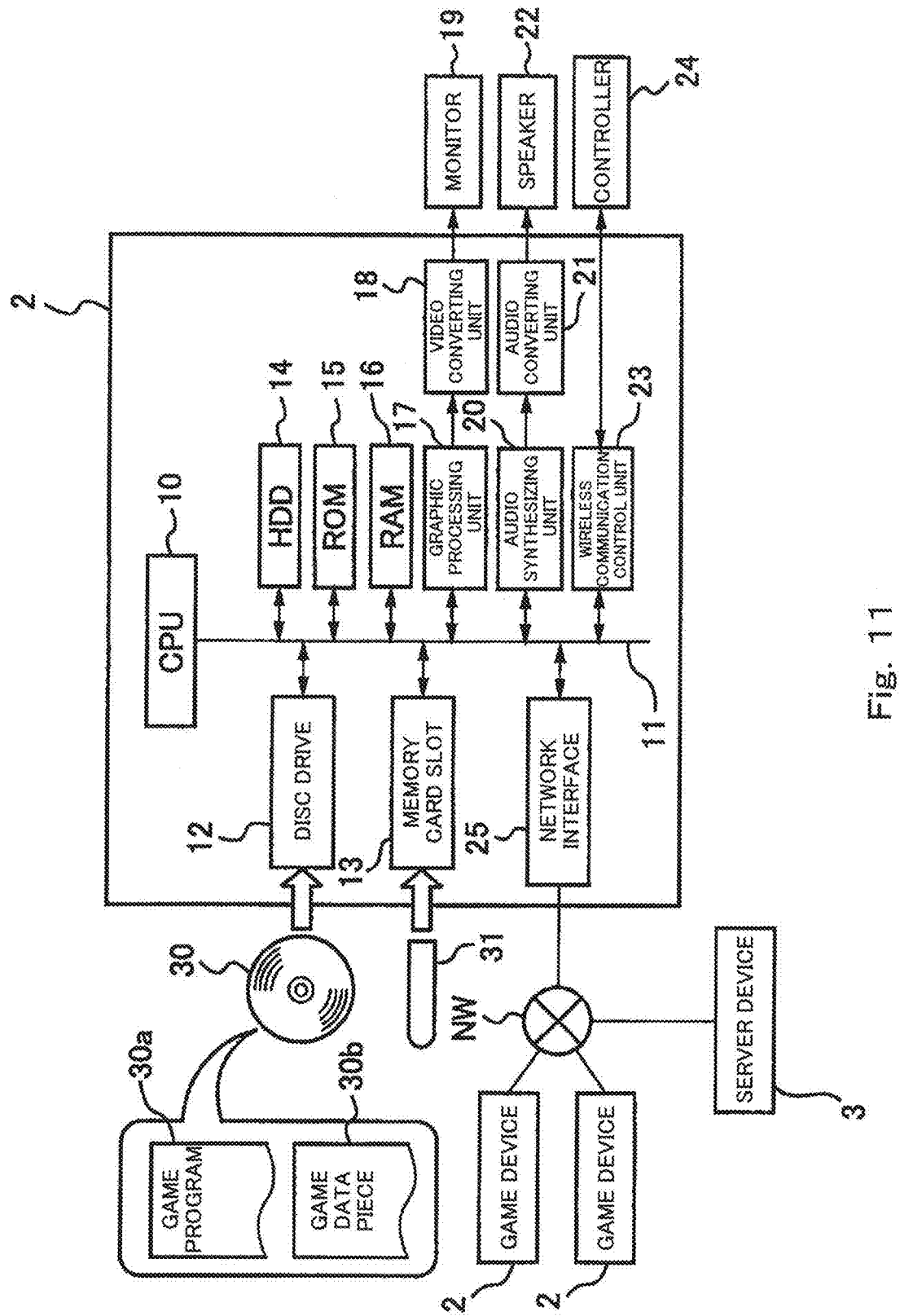
FIG. 11 is a block diagram showing a hardware configuration of a game device in the present embodiment.

The configuration of a game system that realizes the above game will be explained. The game system of the present embodiment is constituted by: a below-described game device 2; and external devices, such as a monitor 19, a speaker 22, and a controller 24, connected to the game device 2. The game system of the present embodiment can provide the game based on a game program 30a and game data 30b loaded from a below-described disc-type storage medium 30. Hereinafter, for ease of explanation, the game system may be simply referred to as the game device 2. FIG. 11 is a block diagram showing a hardware configuration of the game device 2 in the present embodiment. As shown in FIG. 11, the game device 2 is communicable with other game devices 2 and a server device 3 through a communication network NW such as Internet or LAN. The game device 2 includes a CPU 10 that is a computer configured to control operations of the game device 2. A disk drive 12, a memory card slot 13, a HDD 14 as a program storage unit, a ROM 15, and a RAM 16 are connected to the CPU 10 through a bus 11.

The disc-type storage medium 30 such as a DVD-ROM can be inserted into the disk drive 12. The disc-type storage medium 30 records: the game program 30a according to the embodiment of the present invention; and the game data 30b containing characters which appears in the game explained in the present embodiment and objects, texture, and the like necessary for forming a game space. Further, a card-type storage medium 31 can be inserted into the memory card slot 13 and can record save data in accordance with an instruction from the CPU 10. The save data indicates a play situation such as a game interim progress.

The HDD 14 is a large capacity storage medium incorporated in the game device 2 and records the game program 30a and game data 30b loaded from the disc-type storage medium 30, the save data, and the like. The ROM 15 is a semiconductor memory such as a mask ROM or a PROM, and records a start-up program for starting up the game device 2, a program for controlling operations when the disc-type storage medium 30 is inserted, and the like. The RAM 16 is constituted by a DRAM, a SRAM, or the like. The RAM 16 loads the game program 30a to be executed by the CPU 10, the game data 30b necessary when the CPU 10 executes the game program 30a, and the like from the disc-type storage medium 30 and the HDD 14 and temporarily records such programs in accordance with the play situation of the game.

A graphic processing unit 17, an audio synthesizing unit 20, a wireless communication control unit 23, and a network interface 25 are connected to the CPU 10 through the bus 11.

The graphic processing unit 17 draws a game image, including the game space and the characters, in accordance with an instruction from the CPU 10. The monitor 19 that is the external device is connected to the graphic processing unit 17 through a video converting unit 18. The game image drawn by the graphic processing unit 17 is converted into a moving image format by the video converting unit 18 to be displayed on the monitor 19.

The audio synthesizing unit 20 reproduces and synthesizes digital game sound in accordance with an instruction from the CPU 10. The speaker 22 that is the external device is connected to the audio synthesizing unit 20 through an audio converting unit 21. Therefore, the game sound reproduced and synthesized by the audio synthesizing unit 20 is decoded to an analog format by the audio converting unit 21 to be output through the speaker 22 to outside.

The wireless communication control unit 23 includes a 2.4 GHz band wireless communication module, is wirelessly connected to the controller 24 attached to the game device 2, and can perform transmission and reception of data. A user can operate an operating element (not shown), such as a button, of the controller 24 to input a signal to the game device 2 and control operations of the player character displayed on the monitor 19. The network interface 25 connects the game device 2 to the communication network NW, such as Internet or LAN, to realize communication of the game device 2 with the other game devices 2 and the server device 3. When the game device 2 is connected to the other game devices 2 through the communication network NW, and the transmission and reception of the data are performed thereamong, a plurality of player characters can be displayed in the same game space in sync with one another. Thus, multiplay is realized, that is, plural users can cooperate to proceed with the game.

Functional Configuration of Game Device

Figure 12:
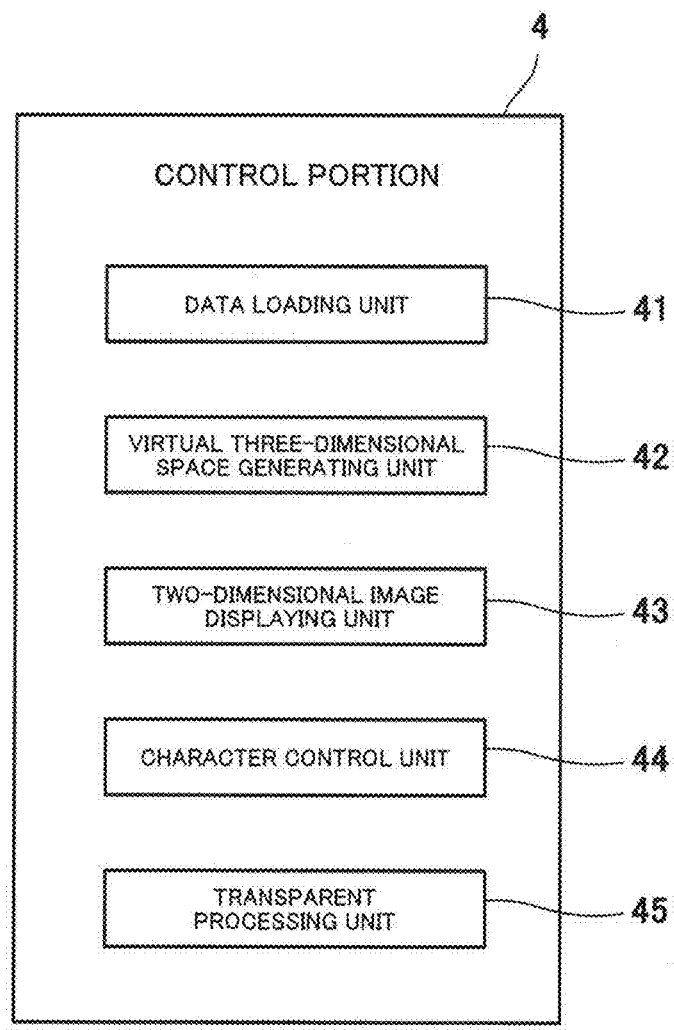
FIG. 12 is a block diagram showing a functional configuration of the game device shown in FIG. 11.

FIG. 12 is a block diagram showing a functional configuration of the game device 2 shown in FIG. 11. As shown in FIG. 11, the game device 2 operates as a computer including a control unit 4. The control unit 4 includes the CPU 10, the HDD 14, the ROM 15, the RAM 16, the graphic processing unit 17, the video converting unit 18, the audio synthesizing unit 20, the audio converting unit 21, the network interface 25, and the like. As a data group for generating the virtual three-dimensional space F, the game data 30b contains the first data 122 (or the reproduction video image data 129 based on the first data 122), the second data 125, the third data 126, the character data 127, and the light source data 128. As shown in FIG. 12, the control unit 4 of the game device 2 executes the game program 30a of the present invention to achieve functions of a data loading unit (data loading module) 41, a virtual three-dimensional space generating unit (virtual three-dimensional space generating module) 42, a two-dimensional image displaying unit (two-dimensional image displaying module) 43, a character control unit (character control module) 44, a transparent processing unit (transparent processing module) 45, and the like.

The data loading unit 41 loads the data group contained in the game data 30b. The virtual three-dimensional space generating unit 42 generates the virtual three-dimensional space F (FIG. 2) generated by combining the first data 122 and the second data 125 based on the loaded third data 126. Further, the virtual three-dimensional space generating unit 42 arranges the item object A and the like at predetermined positions in the virtual three-dimensional space F.

It should be noted that the first data 122 and the second data 125 may be combined with each other based on the third data 126 in advance to be stored as the game data 30b. In this case, the data loading unit 41 loads the first data 122, the second data 125, and the third data 126 in a state where these data 122, 125, and 126 are combined with one another. For example, when the first data 122 and the second data 125 correspond to each other one to one, a loading speed or a drawing speed can be increased by combining the first data 122 and the second data 125 in advance as data.

Instead of this, the first data 122, the second data 125, and the third data 126 may be separately stored as the game data 30b. In this case, the virtual three-dimensional space generating unit 42 performs an operation of combining the first data 122 and the second data 125 based on the third data 126. For example, in the case of a game in which daytime and nighttime are switched in accordance with an in-game time, a plurality of first data 122 containing a plurality of respective real video images that are different from one another in accordance with time zones may be stored as the game data 30b, and the virtual three-dimensional space generating unit 42 may select the first data 122, which is to be combined with the second data 125, from the plurality of first data 122 in accordance with the in-game time.

As the two-dimensional image of the virtual three-dimensional space F which image is viewed from the position of the virtual camera C, i.e., as the game screen image G shown in FIG. 1, the two-dimensional image displaying unit 43 displays the real video image reproduced at the position of the virtual screen S. The character control unit 44 performs such a control operation that a predetermined character object (character P) is movable in the virtual three-dimensional space F displayed as the two-dimensional image. The character P acts in the virtual three-dimensional space F in accordance with the operation of the controller 24 by the user.

Figure 13:
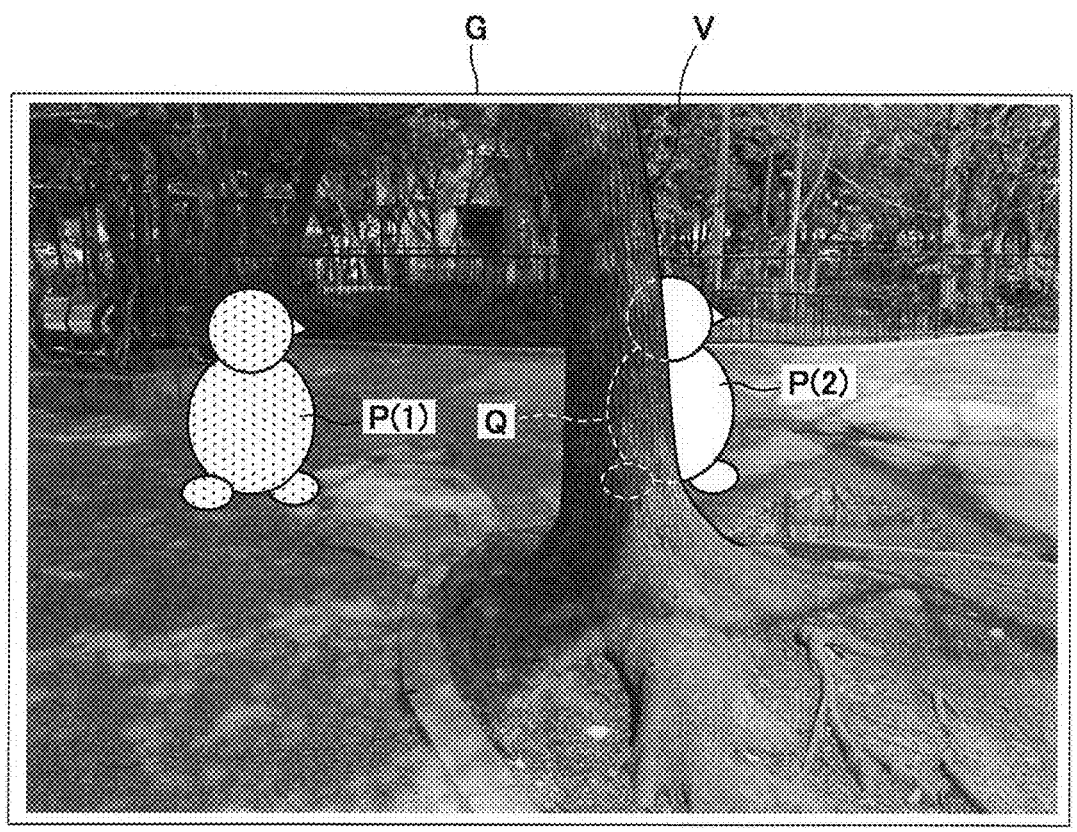
FIG. 13 is a diagram showing another example of the game screen image in the present embodiment.
Figure 14:
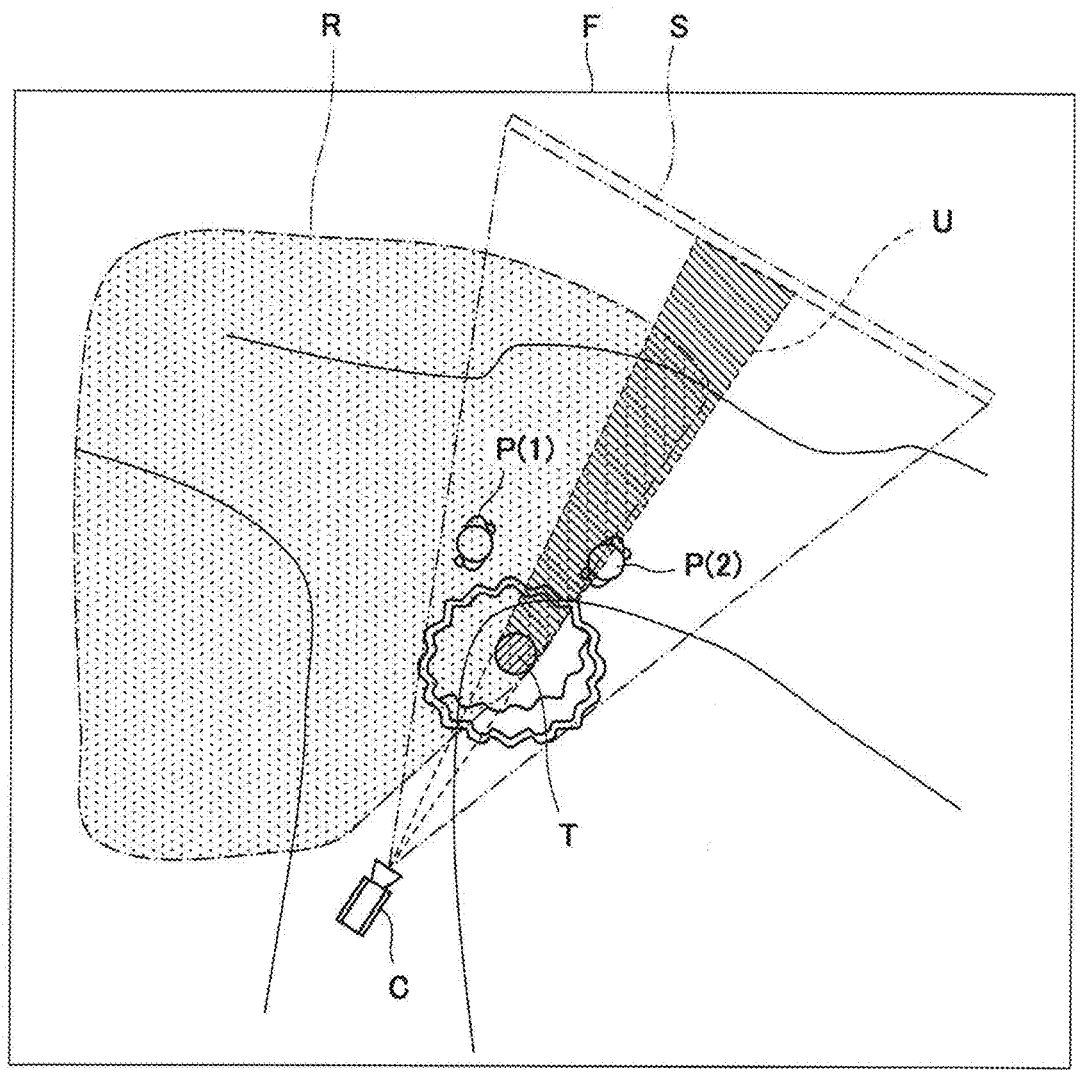
FIG. 14 is a top view showing another example of the virtual three-dimensional space in the present embodiment.

FIG. 13 is a diagram showing another example of the game screen image in the present embodiment. FIG. 14 is a top view showing another example of the virtual three-dimensional space in the present embodiment. The game screen image G shown in FIG. 13 is an image expressed as a two-dimensional image of the virtual three-dimensional space F of FIG. 14 which image is viewed from the virtual camera C. As shown in FIG. 14, a region (shade region) R indicating shade based on the light source data 128 is set in the virtual three-dimensional space F. The two-dimensional image displaying unit 43 determines whether or not the character P is located in the shade region R. When the character P is located in the shade region R, the two-dimensional image displaying unit 43 performs shading processing of shading the character P. For example, as shown in FIG. 13, when a character P(1) is located in the shade (located in the shade region R), the entire character may be shaded, or the brightness of the entire character may be lowered, as compared to when the character P is not located in the shade (not located in the shade region R) as shown in FIG. 1. The shading processing may be applied to not only the character P but also all objects in the virtual three-dimensional space F.

The two-dimensional image displaying unit 43 may perform the shading processing even when the character P is not located in the shade region R. In this case, the two-dimensional image displaying unit 43 performs the shading processing based on the light source data 128 in accordance with a positional relation between a light source position (not shown) and the position of the character P in the virtual three-dimensional space F (virtual three-dimensional CG space K) such that a surface of the character P which surface faces the light source position becomes brighter, and a surface of the character P which surface is opposite to the light source position becomes darker. With this, the shade of the object such the character P can be made similar to the shade in the actual space. Therefore, even when the objects such as the character P are displayed on the game screen image G shown by the real video image, strange feelings caused by the existence of the objects that do not really exist in the real video image can be reduced.

As described above, in the game screen image G in the present embodiment, a space where the character P moves is expressed by the real video image. To be specific, the character P is always expressed on the real video image. Therefore, as shown in FIG. 13, if a shielding object V such as a tree exists in front of a region (passage), where the character P moves, on the game screen image G, and the character P moves along the passage, the character P which should be hidden by the shielding object V is displayed in front of the shielding object V. This deteriorates the reality of the virtual three-dimensional space F. If a compositional arrangement shown in FIG. 13 cannot be used as the real video image, the degree of freedom of the position where the virtual camera C is provided (i.e., the degree of freedom of the selection of the real video image) decreases.

Therefore, when the character P overlaps a predetermined object in the real video image displayed as the two-dimensional image and is located at an opposite side (i.e., a virtual screen position side) from the virtual camera position across the position of an object (shielding object) T corresponding to the object (shielding object) V in the virtual three-dimensional space F, the transparent processing unit 45 performs transparent processing of making a part Q, which overlaps the object, of the character P transparent. More specifically, when the shielding object V exists between the position of the virtual camera C and the passage or the like, where the character P may be located, in the virtual three-dimensional space F, an object corresponding to the shielding object V is designated in advance as the shielding object T. The transparent processing unit 45 determines whether or not at least a part of the character P is located in a shielding region U located between the shielding object T and the virtual screen S. When it is determined that at least a part of the character P is located in the shielding region U, the transparent processing unit 45 makes the part Q of the character P transparent, the part Q being located in the shielding region U. Further, the transparent processing unit 45 performs the transparent processing with respect to the objects other than the character P in the same manner as above.

With this, even though the character P is always displayed in front of the real video image in the game screen image G, the character P can be expressed as if the character P is located behind the predetermined shielding object V. Thus, the depth direction in the virtual three-dimensional space using the real video image can be expressed more effectively. Further, the degree of freedom of the selection of the real video image adoptable as the two-dimensional image displayed on the game screen image G can be increased.

The foregoing has explained the embodiment of the present invention. However, the present invention is not limited to the above embodiment, and various improvements, changes, and modifications may be made within the scope of the present invention.

For example, the above embodiment has explained a case where the positions of the virtual camera C and the virtual screen S are fixed. However, the above embodiment can adopt a case where the virtual camera C and the virtual screen S move (a case of using the real video images taken while moving the camera).

Further, the above embodiment has explained a case where the two-dimensional image displaying unit 43 and the transparent processing unit 45 are function modules executed by the control unit 4 of the game device 2. However, the two-dimensional image displaying unit 43 and the transparent processing unit 45 may be configured as function modules executed by the computer 101 configured to generate the virtual three-dimensional space. In other words, the computer 101 may generate the virtual three-dimensional space in which: the two-dimensional image can be displayed; and the transparent processing can be executed.

The above embodiment was explained based on an example where the generated virtual three-dimensional space F is applied to a game program by which a user operates the character P, acting in the virtual three-dimensional space, to proceed with the scenario. However, the present invention is not limited to this as long as interactive operations are performed between a user and a video image program.

The above embodiment has explained a stationary game device. However, the present invention is suitably applicable to mobile game devices, mobile phones, and computers such as personal computers.

INDUSTRIAL APPLICABILITY

The present invention is useful to express the depth direction in the virtual three-dimensional space using the real video image without causing strange feelings.

REFERENCE SIGNS LIST 2 game device
4 control unit
30a game program
30b game data
41 data loading unit
42 virtual three-dimensional space generating unit
43 two-dimensional image displaying unit
44 character control unit
45 transparent processing unit
101 computer
102 storage device
111 reference object data generating unit
112 second data generating unit
113 third data generating unit
114 character generating unit
121 virtual three-dimensional space generating program
122 first data
123 still image data
124 reference object data
125 second data
126 third data
B characteristic point of reference object
C virtual camera
D reference object
F virtual three-dimensional space
G game screen image (two-dimensional image)
M polygon mesh (boundary of object)
OD reference object
P character (character object)
S virtual screen
T shielding object
V shielding object
VD virtual reference object

The invention claimed is:

1. A method of generating a virtual three-dimensional space,
the method comprising the steps of:
specifying a positional relation between a virtual screen position and a virtual camera position from first data containing a real video image of an actual space, the real video image being taken from a predetermined camera position at a predetermined view angle, the real video image being displayed at the virtual screen position, the virtual camera position corresponding to the predetermined camera position, and generating three-dimensional reference object data which indicates a boundary of a predetermined reference object contained in the real video image and in which the boundary is associated with the predetermined reference object in the real video image based on the positional relation;
generating second data indicating an object constituting a virtual three-dimensional computer graphics (CG) space generated by reproducing the actual space, where the real video image is taken, by computer graphics; and
generating third data based on the first data and the second data, the third data being data for generating the virtual three-dimensional space, wherein
the step of generating the third data causes the boundary of the predetermined reference object in the reference object data and a boundary of the object corresponding to the predetermined reference object in the second data to coincide with each other to generate the third data in which the virtual camera position in the virtual three-dimensional CG space is determined based on the predetermined view angle of the real video image.

2. The method according to claim 1, further comprising generating a character that is movable in the virtual three-dimensional space.

3. The method according to claim 2, further comprising:
displaying the real video image reproduced as a two-dimensional image of the virtual three-dimensional space, the two-dimensional image being viewed from the virtual camera position; and
performing transparent processing of making a part of the character transparent, the part overlapping the predetermined object, when the character overlaps a predetermined object in the real video image displayed as the two-dimensional image and is located at an opposite side from the virtual camera position across a position of an object corresponding to the predetermined object in the virtual three-dimensional space.

4. The method according to claim 1, wherein the step of generating the reference object data acquires a characteristic point group of the real video image, containing the predetermined reference object, to generate the reference object data.

5. The method according to claim 1, wherein the predetermined reference object is an artificial object provided in the actual space.

6. The method according to claim 5, wherein:
the real video image is produced by taking a video image including the artificial object set as the predetermined reference object and then removing the artificial object while continuously taking the video image;
when generating the reference object data, a part of the real video image is utilized, the part containing the artificial object; and
when generating the virtual three-dimensional space by the real video image, a different part of the real video image is utilized, the different part not containing the artificial object.

7. A video system operable by a user,
the video system comprising:
a data loading module configured to load a data group including
first data containing a real video image of an actual space, the real video image being taken from a predetermined camera position at a predetermined view angle,
second data indicating a boundary of an object constituting a virtual three-dimensional CG space generated by reproducing the actual space, where the real video image is taken, by computer graphics, and third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space;

a virtual three-dimensional space generating module configured to generate a virtual three-dimensional space generated by combining the first data and the second data based on the third data;

a two-dimensional image displaying module configured to display the real video image reproduced as a two-dimensional image of the virtual three-dimensional space, the two-dimensional image being viewed from the virtual camera position; and a character control module configured to perform such a control operation that a predetermined character object is movable in the virtual three-dimensional space displayed as the two-dimensional image.

8. The video system according to claim 7, further comprising a transparent processing module configured to, when the character object overlaps a predetermined object in the real video image displayed as the two-dimensional image and is located at an opposite side from the virtual camera position across a position of an object corresponding to the predetermined object in the virtual three-dimensional space, perform transparent processing of making a part of the character object transparent, the part overlapping the predetermined object.

9. A method of controlling a video system operable by a user, the method comprising:
loading a data group including
first data containing a real video image of an actual space, the real video image being taken from a predetermined camera position at a predetermined view angle,
second data indicating a boundary of an object constituting a virtual three-dimensional CG space generated by reproducing the actual space, where the real video image is taken, by computer graphics, and
third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space;

generating a virtual three-dimensional space generated by combining the first data and the second data based on the third data;

displaying the real video image reproduced as a two-dimensional image of the virtual three-dimensional space, the two-dimensional image being viewed from the virtual camera position; and performing such a control operation that a predetermined character object is movable in the virtual three-dimensional space displayed as the two-dimensional image.

10. The method according to claim 9, further comprising, when the character object overlaps a predetermined object in the real video image displayed as the two-dimensional image and is located at an opposite side from the virtual camera position across a position of an object corresponding to the predetermined object in the virtual three-dimensional space, performing transparent processing of making a part of the character object transparent, the part overlapping the predetermined object.

11. A non-transitory computer readable storage medium storing a command executable by a control unit of a computer device, the command comprising:
loading a data group including
first data containing a real video image of an actual space, the real video image being taken from a predetermined camera position at a predetermined view angle,
second data indicating a boundary of an object constituting a virtual three-dimensional CG space generated by reproducing the actual space, where the real video image is taken, by computer graphics, and
third data in which a virtual camera position, corresponding to the predetermined camera position of the real video image, in the virtual three-dimensional CG space is determined based on the predetermined view angle of the real video image such that an object contained in the real video image coincides with the boundary of the object constituting the virtual three-dimensional CG space;

generating a virtual three-dimensional space generated by combining the first data and the second data based on the third data;

displaying the real video image reproduced as a two-dimensional image of the virtual three-dimensional space, the two-dimensional image being viewed from the virtual camera position; and performing such a control operation that a predetermined character object is movable in the virtual three-dimensional space displayed as the two-dimensional image.

12. The non-transitory computer readable storage medium according to claim 11, wherein the command further comprises, when the character object overlaps a predetermined object in the real video image displayed as the two-dimensional image and is located at an opposite side from the virtual camera position across a position of an object corresponding to the predetermined object in the virtual three-dimensional space, performing transparent processing of making a part of the character object transparent, the part overlapping the predetermined object.

* * * * *